(12) United States Patent
Velusamy et al.

(10) Patent No.: US 12,434,648 B2
(45) Date of Patent: Oct. 7, 2025

(54) SYSTEMS AND METHODS FOR ULTRA-WIDE BAND BASED VEHICLE SENSING

(71) Applicant: Ford Global Technologies, LLC, Dearborn, MI (US)

(72) Inventors: Sai Prasanth Velusamy, Canton, MI (US); Vivekanandh Elangovan, Canton, MI (US)

(*) Notice: Subject to any disclaimer, the term of this patent is extended or adjusted under 35 U.S.C. 154(b) by 154 days.

(21) Appl. No.: 18/338,018

(22) Filed: Jun. 20, 2023

(65) Prior Publication Data

US 2024/0425005 A1 Dec. 26, 2024

(51) Int. Cl.
*B60R 16/037* (2006.01)
*B60N 2/00* (2006.01)
*G01S 13/88* (2006.01)

(52) U.S. Cl.
CPC .......... *B60R 16/037* (2013.01); *B60N 2/0024* (2023.08); *G01S 13/88* (2013.01)

(58) Field of Classification Search
CPC ...... B60R 16/037; B60N 2/0024; G01S 13/88
See application file for complete search history.

(56) References Cited

U.S. PATENT DOCUMENTS

| 10,172,145 B2 | 1/2019 | Hazebrouck et al. |
| 12,061,250 B2 * | 8/2024 | Ette ......................... G01S 13/42 |
| 2020/0309932 A1 * | 10/2020 | Zeng ......................... G07C 5/08 |
| 2020/0348406 A1 * | 11/2020 | Jain ..................... G01S 13/0209 |
| 2022/0075051 A1 | 3/2022 | Woo et al. |
| 2022/0135002 A1 | 5/2022 | Hassani et al. |
| 2022/0383716 A1 | 12/2022 | Casamassima et al. |

OTHER PUBLICATIONS

Sohee Lim et al., Detection and Localization of People Inside Vehicle Using Impulse Radio Ultra-Wideband Radar Sensor, IEEE Sensors Journal, vol. XX, No. XX, Dec. 20, 2019 pp. 1-10.
Zhicheng Yang et al., Contactless Breathing Rate Monitoring in Vehicle Using UWB Radar, RealWSN'18, Nov. 4, 2018, pp. 13-18.

* cited by examiner

*Primary Examiner* — Peter D Nolan
*Assistant Examiner* — Demetra R Smith-Stewart
(74) *Attorney, Agent, or Firm* — Frank Lollo; Eversheds Sutherland (US) LLP

(57) ABSTRACT

A vehicle including an ultra-wide band (UWB) transceiver is disclosed. The UWB transceiver may be configured to operate in a first mode and a second mode. The UWB transceiver may be configured to perform phone-as-a-key (PaaK) localization in the first mode and radar sensing in the second mode. The vehicle may further include a processor configured to activate the UWB transceiver in the first mode. The processor may receive a trigger signal to switch the UWB transceiver from the first mode to the second mode. Responsive to receiving the trigger signal, the processor may cause the UWB transceiver to transmit a radar pulse signal and receive a radar response signal reflected from a target located inside the vehicle. Based on the response signal, the processor may determine a sitting area profile and an occupant presence on a sitting area, and perform sitting area adjustment.

20 Claims, 6 Drawing Sheets

SYSTEMS AND METHODS FOR ULTRA-WIDE BAND BASED VEHICLE SENSING

TECHNICAL FIELD

The present disclosure relates to a vehicle sensing system and method, and more particularly, to a system and method to facilitate vehicle sensing using ultra-wide band sensors.

BACKGROUND

Modern vehicles include sensors or sensing modules that monitor vehicle interior portions or vehicle exterior portions. For example, a vehicle may include a sensing module that may detect presence of an object or an occupant in the vehicle. The sensing module may include ultrasonic sensors, cameras, and/or the like, that monitor the vehicle interior portion or the vehicle exterior portion. While the sensing module may provide benefits to a vehicle user, the sensing module may draw significant vehicle energy. This may cause inconvenience to the user, especially if the energy is consumed during vehicle key-off scenarios.

Thus, there is a need for a system and method that may monitor the vehicle interior portion and vehicle exterior portion without drawing significant vehicle energy.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
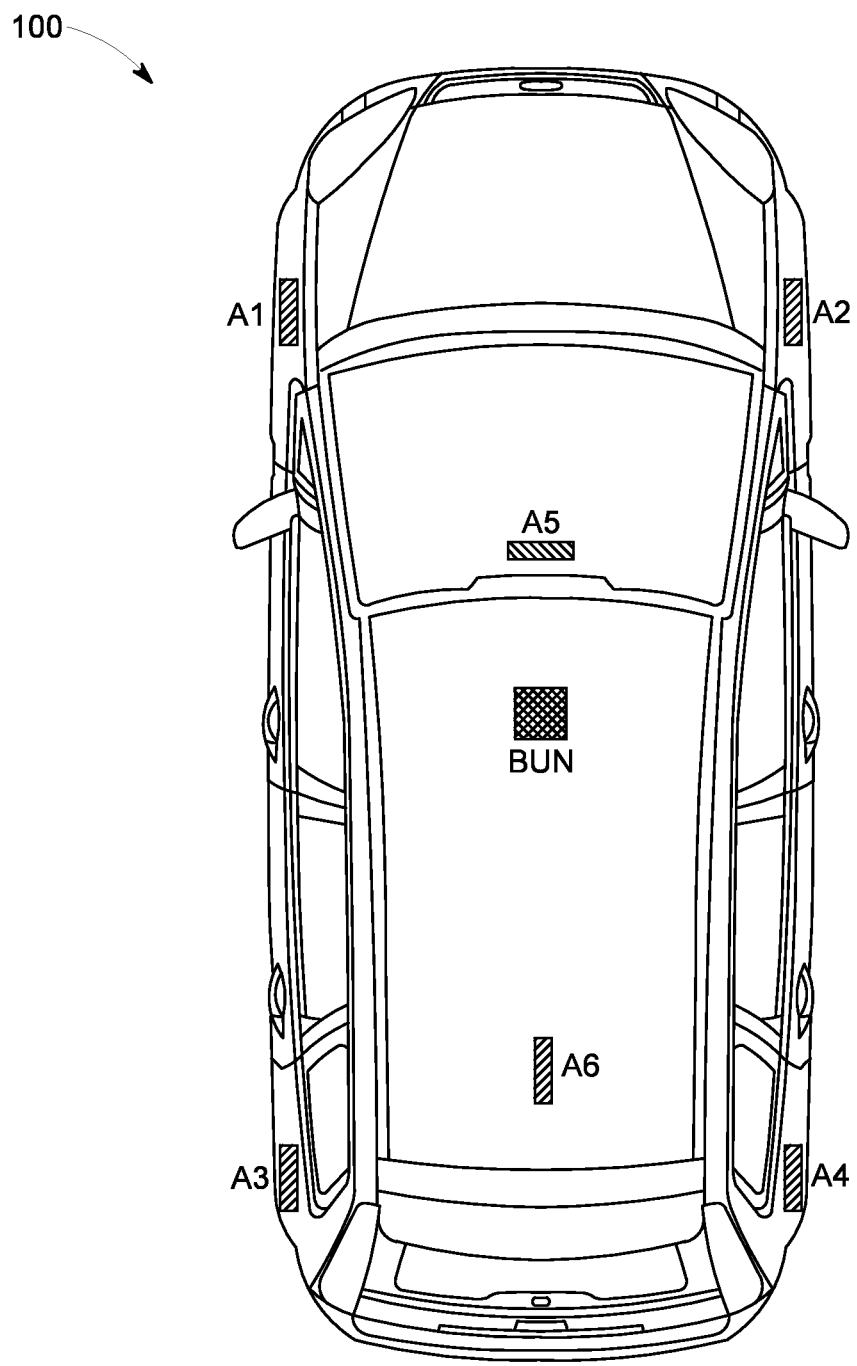
FIG. 1 depicts an example vehicle in which techniques and structures for providing the systems and methods disclosed herein may be implemented.

The present disclosure describes an ultra-wideband (UWB) based vehicle sensing system. The system may utilize UWB transceivers/sensors located in a vehicle in a radar mode to estimate sitting area profile (such as foot well/legroom estimation, sitting area inclination estimation, etc.) and determine occupant presence. The system may perform sitting area adjustment based on the estimation of the sitting area profile and the occupant presence.

The system may cause the UWB transceivers to operate in dual mode in each UWB operational cycle (e.g., a first UWB cycle and a second UWB cycle). For example, the system may cause the UWB transceivers to operate in a first mode in which the UWB transceivers may perform phone-as-a-key (PaaK) localization. Similarly, the system may cause the UWB transceivers to operate in a second mode in which the UWB transceivers may perform radar sensing or vehicle interior portion sensing using radar signals.

In some aspects, the system may cause the UWB transceivers to perform PaaK localization and radar sensing in both the first UWB cycle and the second UWB cycle. For example, in the first UWB cycle, the system may cause the UWB transceivers to operate in the first mode in a first predetermined time duration, and in the second mode in a second predetermined time duration. In the first predetermined time duration of the first UWB cycle, the system may cause the UWB transceivers to transmit a UWB localization signal. In the second predetermined time duration of the first UWB cycle, the system may cause the UWB transceivers to transmit a radar pulse signal.

Furthermore, in a third predetermined time duration of the second UWB cycle, the system may cause the UWB transceivers to sample a localization response signal (associated with the transmitted UWB localization signal). In addition, in a fourth predetermined time duration of the second UWB cycle, the system may cause the UWB transceivers to sample a radar response signal (associated with the transmitted radar pulse signal). In some aspects, the first and the third predetermined time durations may be equivalent to each other, and the second and the fourth predetermined time durations may be equivalent to each other.

The system may be further configured to perform one or more actions (in addition to sitting area adjustment) by analyzing the radar response signal. For example, the system may control operation of vehicle Heating, Ventilation, and Air Conditioning (HVAC) system, detect objects left behind in the vehicle during key-off scenarios, monitor pet/occupant activity, and/or the like, based on the radar response signal analysis.

The present disclosure describes a system and method that uses existing vehicle UWB transceivers to perform vehicle sensing, thus conserving vehicle energy and eliminating need to use other vehicle components for sensing (e.g., cameras). The system uses the UWB transceivers to accurately estimate the leg room, foot well, etc. and perform dynamic sitting area adjustment in the vehicle, without requiring manual intervention. The system also controls operation of other vehicle components, e.g., HVAC systems, vehicle interior cameras, light, etc. based on the radar response signal processing, thus further conserving vehicle energy. In addition, the system may cause the UWB transceivers to perform both the PaaK localization and the radar sensing in the same polling time duration (e.g., 100 ms), thereby reducing energy consumption.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example vehicle 100 in which techniques and structures for providing the systems and methods disclosed herein may be implemented. The vehicle 100 may take the form of any passenger or commercial vehicle such as, for example, a car, a work vehicle, a crossover vehicle, a van, a minivan, a taxi, a bus, etc. Further, the vehicle 100 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

The vehicle 100 may include a plurality of ultra-wide band (UWB) transceivers (such as UWB transceivers A1-A6). The terms "UWB transceiver," "UWB sensor," "UWB anchor," "UWB module," or the like may be used interchangeably herein. The UWB transceivers A1-A6 may be installed at different positions in the vehicle 100, as shown in FIG. 1. Though six UWB transceivers are shown in FIG. 1, in other cases, more than, or less than, six UWB transceivers may be employed.

In an exemplary aspect, the UWB transceivers A1-A4 may be located in vehicle exterior portion, and the UWB transceivers A5 and A6 may be located in vehicle interior portion. For example, the UWB transceiver A1 may be mounted on a driver side front bumper, UWB transceiver A2 may be mounted on a passenger side front bumper, UWB transceiver A3 may be mounted on a driver side rear bumper, and UWB transceiver A4 may be mounted on a passenger side rear bumper. In some aspects, one or more UWB transceivers may perform vehicle exterior portion sensing, for example, by using UWB transceivers A1, A2, A3, and A4. In some aspects, one or more UWB transceivers may perform vehicle interior portion sensing (or cabin monitoring), for example, by using UWB transceivers A5 and A6. In further aspects, the vehicle 100 may include a BUN (for example, BLE, UWB, and/or NFC) module that may have a UWB transceiver. Depending on vehicle size, the BUN and one UWB transceiver (for example, UWB transceivers A5 or A6 and/or any other UWB transceiver) may perform the vehicle interior portion sensing. In some aspects, the UWB transceiver A5, A6, and BUN may together perform the vehicle interior portion sensing. In further aspects, the vehicle 100 may include any other module (instead of BUN) that may include BLE and UWB transceivers that may perform vehicle interior portion sensing.

The vehicle 100 may further include a vehicle sensing system or "system" (shown as vehicle sensing system 208 in FIG. 2) that may be configured to control operation of each UWB transceiver (such as UWB transceivers A1-A6 and the UWB transceiver in the BUN) in the vehicle 100. In some aspects, the system may be configured to cause each UWB transceiver to operate in a first mode or a second mode. In the first mode, the UWB transceiver may be configured to perform phone-as-a-key (PaaK) localization. In the second mode, the UWB transceiver may be configured to perform radar sensing. Stated another way, in the second mode, the UWB transceiver may be configured to act as a radar to perform vehicle interior portion sensing (and/or vehicle exterior portion sensing).

Based on the vehicle interior portion sensing, the system may be configured to perform one or more actions including, but not limited to, automatic sitting area adjustment, vehicle component (such as Heating, Ventilation, and Air Conditioning (HVAC) system, lights, etc.) control, transmit an alert when an object or an occupant may be left behind in the vehicle 100, and/or the like. Some of the above-mentioned actions may be performed in key-off scenarios, and some actions may be performed when the vehicle 100 may be in active mode (e.g., when the vehicle 100 may be moving). For example, the system may transmit an alert when an object or an occupant may be left behind in the vehicle 100 during key-off scenarios. In some aspects, the system may detect occupant presence, and perform the automatic sitting area adjustment and/or control the HVAC system when the vehicle 100 may be moving (or when the vehicle ignition may be turned ON). The details of the system may be understood in conjunction with figures described below.

The vehicle 100 and the system may implement and/or perform operations, as described here in the present disclosure, in accordance with the owner manual and safety guidelines.

Figure 2:
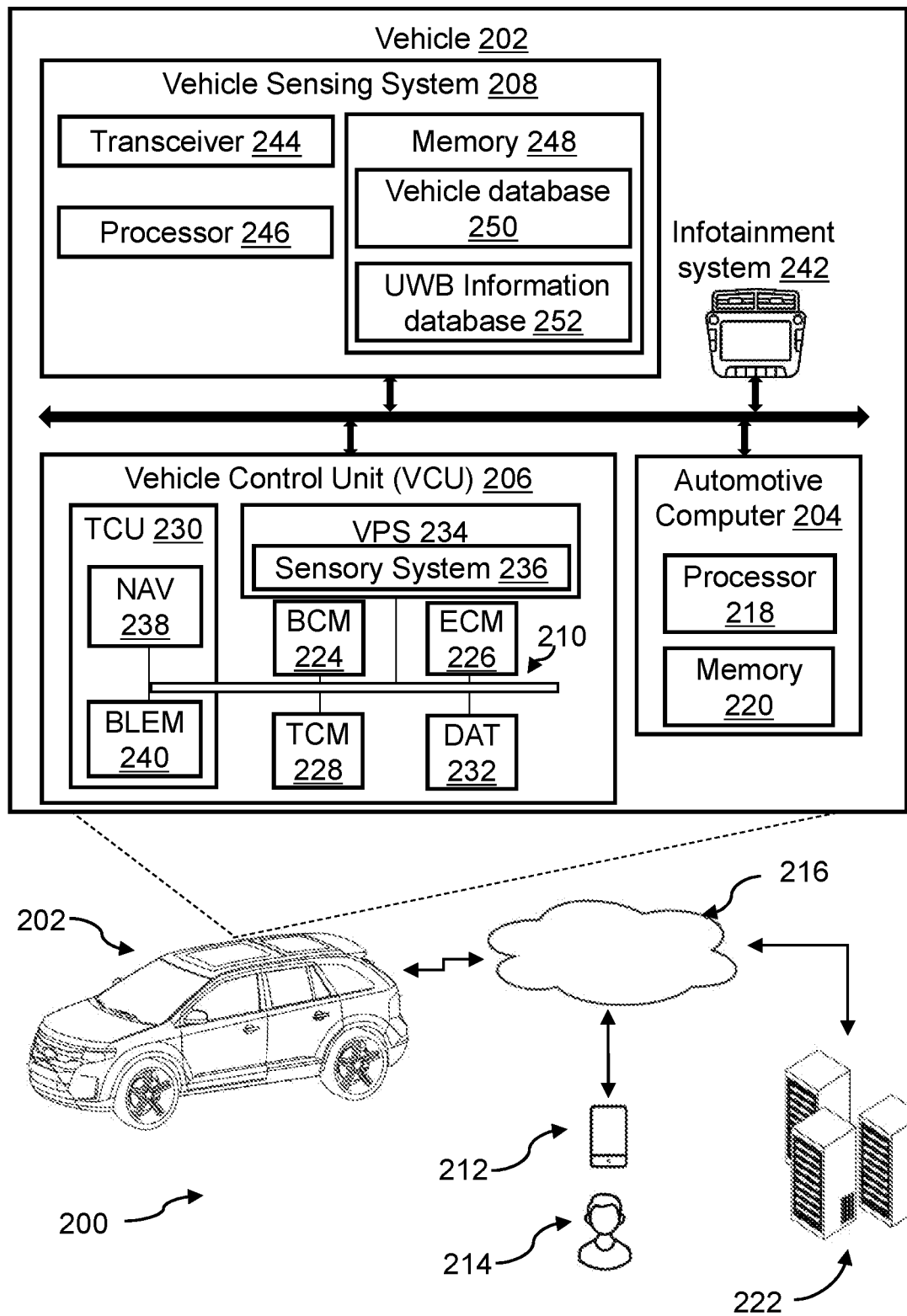
FIG. 2 illustrates a block diagram of an example system to perform vehicle sensing using ultra-wide band (UWB) transceiver, in accordance with the present disclosure.

FIG. 2 illustrates a block diagram of an example system 200 to perform vehicle sensing using ultra-wide band (UWB) transceiver, in accordance with the present disclosure.

The system 200 may include a vehicle 202, which may be same as the vehicle 100. The vehicle 202 may include an automotive computer 204, a Vehicle Control Unit (VCU) 206, and a vehicle sensing system 208. The VCU 206 may include a plurality of Electronic Control Units (ECUs) 210 disposed in communication with the automotive computer 204 and/or the vehicle sensing system 208.

The system 200 may further include a mobile device 212 that may connect with the automotive computer 204 and/or the vehicle sensing system 208 by using wired and/or wireless communication protocols and transceivers. The mobile device 212 may be associated with a user 214 (e.g., a vehicle owner). The mobile device 212 may be, for example, a mobile phone or a smartphone, a tablet, a smartwatch, a laptop, a computer, a wearable communication device or any other similar device with wired/wireless communication capabilities. The mobile device 212 may communicatively couple with the vehicle 202 and may execute a phone-as-a-key (PaaK) application ("app") to access vehicle functions, via one or more network(s) 216, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

The network(s) 216 illustrates an example communication infrastructure in which the connected devices discussed in various embodiments of this disclosure may communicate. The network(s) 216 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples. In some aspects, the automotive computer 204 and/or the vehicle sensing system 208 may be installed in a vehicle engine compartment (or elsewhere in the vehicle 202), in accordance with the disclosure. Further, the automotive computer 204 may operate as a functional part of the vehicle sensing system 208. The automotive computer 204 may be or include an electronic vehicle controller, having one or more processor(s) 218 and a memory 220. Moreover, the vehicle sensing system 208 may be separate from the automotive computer 204 (as shown in FIG. 2) or may be integrated as part of the automotive computer 204.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable memory storing a vehicle sensing program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In addition, the automotive computer 204 and/or the vehicle sensing system 208 may be disposed in communication with one or more server(s) 222 and the mobile device 212. The server(s) 222 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In some aspects, the server 222 may host the PaaK app that may be installed on the mobile device 212.

In accordance with some aspects, the VCU 206 may share a power bus with the automotive computer 204 and the vehicle sensing system 208, and may be configured and/or programmed to coordinate the data between vehicle systems, connected servers (e.g., the server(s) 222), and other vehicles (not shown in FIG. 2) operating as part of a vehicle fleet. The VCU 206 can include or communicate with any combination of the ECUs 210, such as, for example, a Body Control Module (BCM) 224, an Engine Control Module (ECM) 226, a Transmission Control Module (TCM) 228, a telematics control unit (TCU) 230, a Driver Assistances Technologies (DAT) controller 232, etc. The VCU 206 may further include and/or communicate with a Vehicle Perception System (VPS) 234, having connectivity with and/or control of one or more vehicle sensory system(s) 236. The vehicle sensory system 236 may include one or more vehicle sensors including, but not limited to, door sensors, sitting area sensors, vehicle proximity sensors, tire pressure sensors, vehicle interior and/or exterior cameras, etc.

In some aspects, the VCU 206 may control vehicle operational aspects and implement one or more instruction sets received from the mobile device 212, including instructions operational as part of the vehicle sensing system 208.

The TCU 230 may be configured and/or programmed to provide vehicle connectivity to wireless computing systems onboard and off board the vehicle 202, and may include a Navigation (NAV) receiver 238 for receiving and processing a GPS signal, a BLE® Module (BLEM) 240, a Wi-Fi transceiver, one or more UWB transceivers (including the UWB transceivers A1-A6 and the BUN described in conjunction with FIG. 1), and/or other wireless transceivers (not shown in FIG. 2) that may be configurable for wireless communication between the vehicle 202 and other systems (e.g., the mobile device 212), computers, and modules. The TCU 230 may be disposed in communication with the ECUs 210 by way of a bus.

In one aspect, the ECUs 210 may control aspects of vehicle operation and communication using inputs from human drivers, inputs from an autonomous vehicle controller, the vehicle sensing system 208, and/or via wireless signal inputs received via the wireless connection(s) from other connected devices, such as the mobile device 212, the server(s) 222, among others.

The BCM 224 generally includes integration of sensors, vehicle performance indicators, and variable reactors associated with vehicle systems, and may include processor-based power distribution circuitry that can control functions associated with the vehicle body such as lights, windows, security, vehicle PaaK system/unit (that may include use of the UWB transceivers A1-A6 and the BUN to perform various functions including high-accuracy localization of mobile device and vehicle interior sensing), vehicle interior and/or exterior camera(s), audio system(s) including microphones, speakers, door locks and access control, vehicle energy management, and various comfort controls. The BCM 224 may also operate as a gateway for bus and network interfaces to interact with remote ECUs (not shown in FIG. 2).

In some aspects, the DAT controller 232 may provide Level-1 through Level-3 automated driving and driver assistance functionality that can include, for example, active parking assistance, trailer backup assistance, adaptive cruise control, lane keeping, and/or driver status monitoring, among other features. The DAT controller 232 may also provide aspects of user and environmental inputs usable for user authentication.

In some aspects, the automotive computer 204 and/or the vehicle sensing system 208 may connect with an infotainment system 242 that may include a touchscreen interface portion, and may include voice recognition features, biometric identification capabilities that can identify users based on facial recognition, voice recognition, fingerprint identification, or other biological identification means. In other aspects, the infotainment system 242 may be further configured to receive user instructions via the touchscreen interface portion, and/or display notifications, navigation maps, etc. on the touchscreen interface portion.

The computing system architecture of the automotive computer 204, the VCU 206, and/or the vehicle sensing system 208 may omit certain computing modules. It should be readily understood that the computing environment depicted in FIG. 2 is an example of a possible implementation according to the present disclosure, and thus, it should not be considered limiting or exclusive.

In accordance with some aspects, the vehicle sensing system 208 may be integrated with and/or executed as part of the ECUs 210. The vehicle sensing system 208, regardless of whether it is integrated with the automotive computer 204 or the ECUs 210, or whether it operates as an independent computing system in the vehicle 202, may include a transceiver 244, a processor 246, and a computer-readable memory 248. The transceiver 244 may be configured to receive information/inputs from external devices or systems, e.g., the mobile device 212, the server 222, and/or the like. Further, the transceiver 244 may transmit notifications, information or requests to the external devices or systems. In addition, the transceiver 244 may be configured to receive signals from the vehicle sensory system 236 and other vehicle components including the UWB transceivers A1-A6 and the BUN of the TCU 230.

The processor 246 and the memory 248 may be same as or similar to the processor 218 and the memory 220, respectively. Specifically, the processor 246 may utilize the memory 248 to store programs in code and/or to store data for performing aspects in accordance with the disclosure. The memory 248 may be a non-transitory computer-readable memory storing the vehicle sensing program code, and may include a vehicle database 250 and a UWB information database 252. The vehicle database 250 may include information associated with the vehicle 202 such as sitting area profile, vehicle type, occupant information (such as occupant profile) associated with occupants/vehicle owner located inside the vehicle 202, etc. The UWB information database 252 may store information measured/captured by the UWB transceivers (e.g., the UWB transceivers A1-A6 and the BUN, as described above in conjunction with FIG. 1). The details of the UWB transceivers and the vehicle sensing system 208 may be understood in conjunction with FIGS. 3-6.

Figure 3:
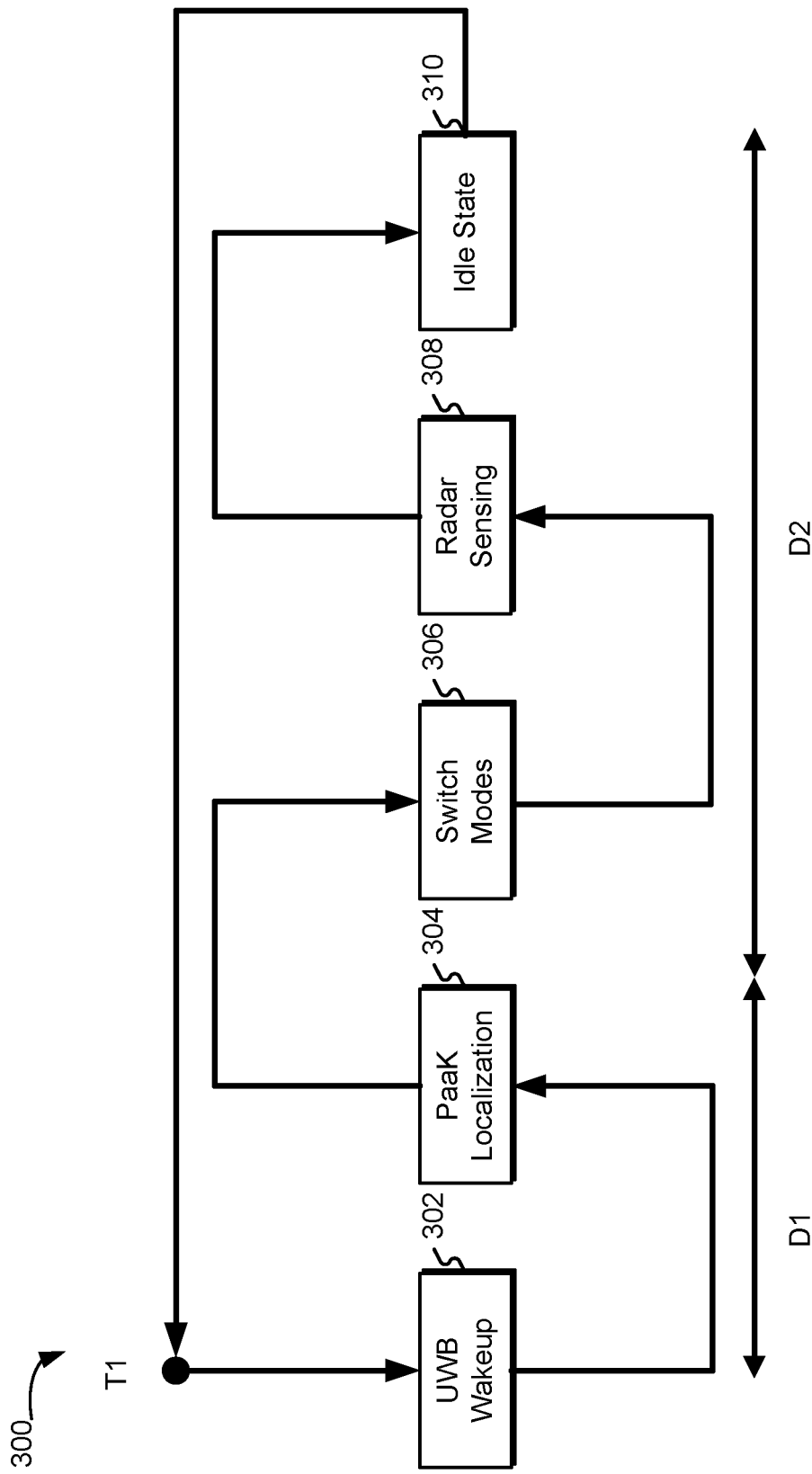
FIG. 3 illustrates an example operational cycle of a UWB transceiver located inside a vehicle, in accordance with the present disclosure.

FIG. 3 illustrates an example operational cycle 300 of a UWB transceiver (e.g., the UWB transceiver A5 or A6) located inside the vehicle 202, in accordance with the present disclosure. Each UWB transceiver A5 or A6 may have an operational cycle (or PaaK polling rate) of a predetermined time duration (e.g., 100 milliseconds (ms)), and may transmit or receive one or more pulses/signals during the time duration. In each operational cycle, the UWB transceiver A5/A6 may be configured to operate in the first mode and the second mode. As described above in conjunction with FIG. 1, the UWB transceiver A5/A6 may perform PaaK localization in the first mode and radar sensing in the second mode. Stated another way, the UWB transceiver A5/A6 may perform dual functions (e.g., PaaK localization and radar sensing) in the same operational cycle or polling rate.

In an exemplary aspect, the UWB transceiver A5/A6 may be configured to perform the PaaK localization and the radar sensing in a first UWB cycle (e.g., the cycle 300) and a second UWB cycle (not shown). The time duration of each of the first UWB cycle and the second UWB cycle may be 100 ms. Stated another way, the time duration of the first UWB cycle may be same as the time duration of the second UWB cycle (e.g., 100 ms). In some aspects, the UWB transceiver A5/A6 may transmit PaaK and radar signals in the first UWB cycle and may sample received PaaK and radar response signals in the second UWB cycle, as described later in the description below.

In operation, the processor 246 may activate the UWB transceiver (e.g., the UWB transceiver A5) at time "T1", as depicted in FIG. 3. Responsive to the activation, the UWB transceiver A5 may wake up, as depicted in block 302 of FIG. 3 and may operate in the first mode. In the first mode, the UWB transceiver A5 may perform PaaK localization, as depicted in block 304 of FIG. 3. In some aspects, the UWB transceiver A5 may wake up and perform PaaK localization in a first predetermined time duration "D1" in the first UWB cycle 300. Specifically, to perform PaaK localization, the UWB transceiver A5 may transmit a UWB localization signal in the first predetermined time duration "D1". In an exemplary aspect, the total time duration (e.g., D1+D2) of the first UWB cycle 300 may be 100 ms, and the first predetermined time duration "D1" may be 23 ms. Stated another way, the UWB transceiver A5 may be configured to perform PaaK localization (or operate in the first mode) within 23 ms of activation/waking up.

The example time durations of 100 ms and 23 ms described above is for illustrative purpose only, and the present disclosure is not limited to these example time durations. The UWB transceiver A5 may operate in the first mode for a time duration different than 23 ms, without departing from the present disclosure scope. Similarly, the total time duration of the first UWB cycle 300 may be different from 100 ms, without departing from the present disclosure scope.

Responsive to the lapse of the first predetermined time duration "D1", the processor 246 may obtain (or generate) a trigger signal to switch the UWB transceiver A5 from the first mode to the second mode, depicted as block 306 in FIG. 3. In some aspects, the processor 246 may obtain the trigger signal from a vehicle timer (not shown), via the transceiver 244. Responsive to obtaining the trigger signal, the processor 246 may switch UWB operational mode from the first mode to the second mode. In an exemplary aspect, the UWB transceiver A5 may change a count of transmitted pulses in the second mode; however, the pulsing rate may remain unchanged.

In the second mode, the UWB transceiver A5 may perform radar sensing to monitor the vehicle interior portion, as depicted in block 308 of FIG. 3. In some aspects, the UWB transceiver A5 may operate in the second mode in a second predetermined time duration "D2" in the first cycle 300 to perform radar sensing. The UWB transceiver A5 may transmit a radar pulse signal in the second predetermined time duration "D2" to perform radar sensing. The radar pulse signal may be generated by encoding transmit signal as radar. In some aspects, the second predetermined time duration "D2" may be 67 ms (e.g., when the total time duration of the first UWB cycle 300 may be 100 ms). In some aspects, the UWB transceiver A5 may transmit a predefined count of radar pulse signals, for example 5-7, in the second predetermined time duration "D2" when the UWB transceiver A5 operates in the second mode.

The processor 246 may cause the UWB transceiver A5 to move to idle/low power state when the second time duration "D2" lapses, depicted as block 310 in FIG. 3.

In further aspects, when the next UWB cycle starts (i.e., in the second UWB cycle, not shown in FIG. 3), the processor 246 may cause the UWB transceiver A5 to operate in the first mode in a third predetermined time duration. The third predetermined time duration may be equivalent to the first predetermined time duration. For example, the third predetermined time duration may be 23 ms. In some aspects, the UWB transceiver A5 may sample a localization response signal (associated with the UWB localization signal transmitted by the UWB transceiver A5 in the first UWB cycle 300) in the third predetermined time duration of the second UWB cycle.

Responsive to the lapse of the third predetermined time duration, the processor 246 may obtain (or generate) another trigger signal to switch the UWB transceiver A5 from the first mode to the second mode. In the second mode of the second UWB cycle, the UWB transceiver A5 may receive and sample radar response signal(s) reflected by one or more objects, target location, or targets (e.g., seat, floor, occupants, etc. located inside the vehicle 202), responsive to transmitting the radar pulse signals in the first UWB cycle 300 to perform radar sensing. Specifically, the radar pulse signals transmitted by the UWB transceiver A5 in the first UWB cycle 300 may penetrate beyond vehicle sitting areas and other objects, and may facilitate in accurate monitoring of vehicle interior portion. For example, the UWB transceiver A5 may facilitate in detecting objects/occupants or locations of objects/occupants inside the vehicle 202, distance between different objects (such as foot well, legroom), etc. by transmitting the radar pulse signals and sampling the reflected radar response signals.

In some aspects, the UWB transceiver A5 may operate in the second mode in a fourth predetermined time duration in the second UWB cycle. The fourth predetermined time duration may be equivalent to the second predetermined time duration. For example, the fourth predetermined time duration may be 67 ms. In this manner, the UWB transceiver A5 may perform both the functions (i.e., PaaK localization and radar sensing/measurements) sequentially in each UWB cycle.

Figure 4:
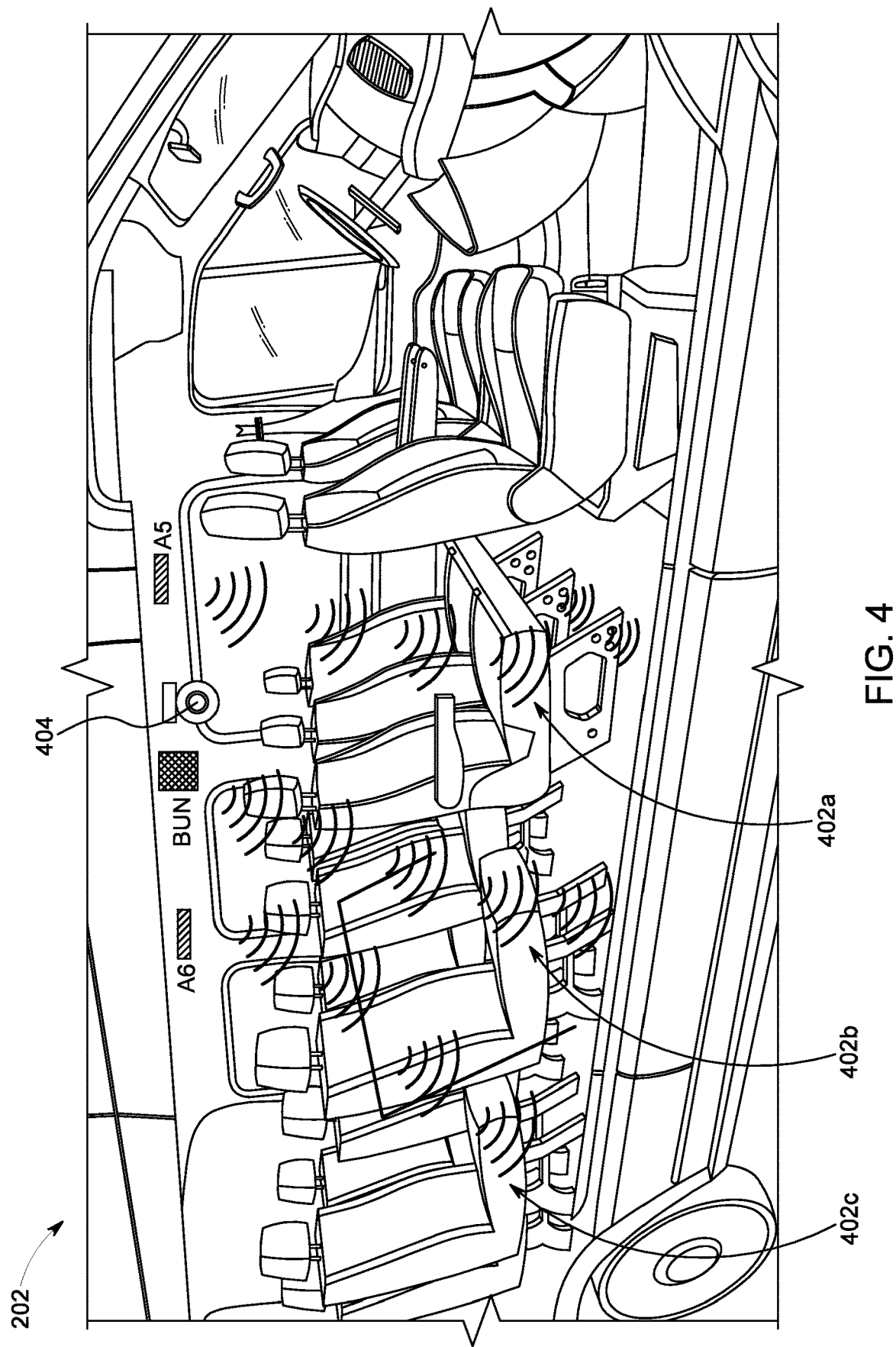
FIG. 4 illustrates an example embodiment to perform vehicle sensing by using UWB transceivers, in accordance with the present disclosure.

FIG. 4 illustrates an example embodiment to perform vehicle interior portion sensing by using the UWB transceivers A5, A6 and the BUN, in accordance with the present disclosure. FIG. 4 will be described in conjunction with FIG. 5, which illustrates example embodiments to control the vehicle 202 by using the UWB transceivers A5, A6 and the BUN, in accordance with the present disclosure.

As described above, vehicle interior portion sensing may be performed by using the UWB transceivers A5, A6 and the BUN (as depicted in FIG. 4) in the second mode of the first and second UWB cycles. The processor 246 may cause the UWB transceivers A5, A6, and the BUN to transmit radar pulse signals in the second mode of the first UWB cycle. The radar pulse signals may penetrate beyond or through sitting areas 402a, 402b, 402c (shown in FIG. 4, hereinafter referred as sitting area 402), and get reflected from one or more objects/targets, e.g., an occupant 502, pets, etc. The UWB transceivers A5, A6 and the BUN may receive and sample the reflected radar response signals in the second mode of the second UWB cycle. The processor 246 may fetch the reflected radar response signals from the UWB transceivers A5, A6 and the BUN, and may perform radar response signal processing, as depicted in block 504 of FIG. 5, to detect object/occupant presence on the sitting area 402. In addition, the processor 246 (or the UWB transceivers A5, A6 and the BUN) may send information associated with the reflected radar response signals to the UWB information database 252 for storage purpose.

Figure 5:
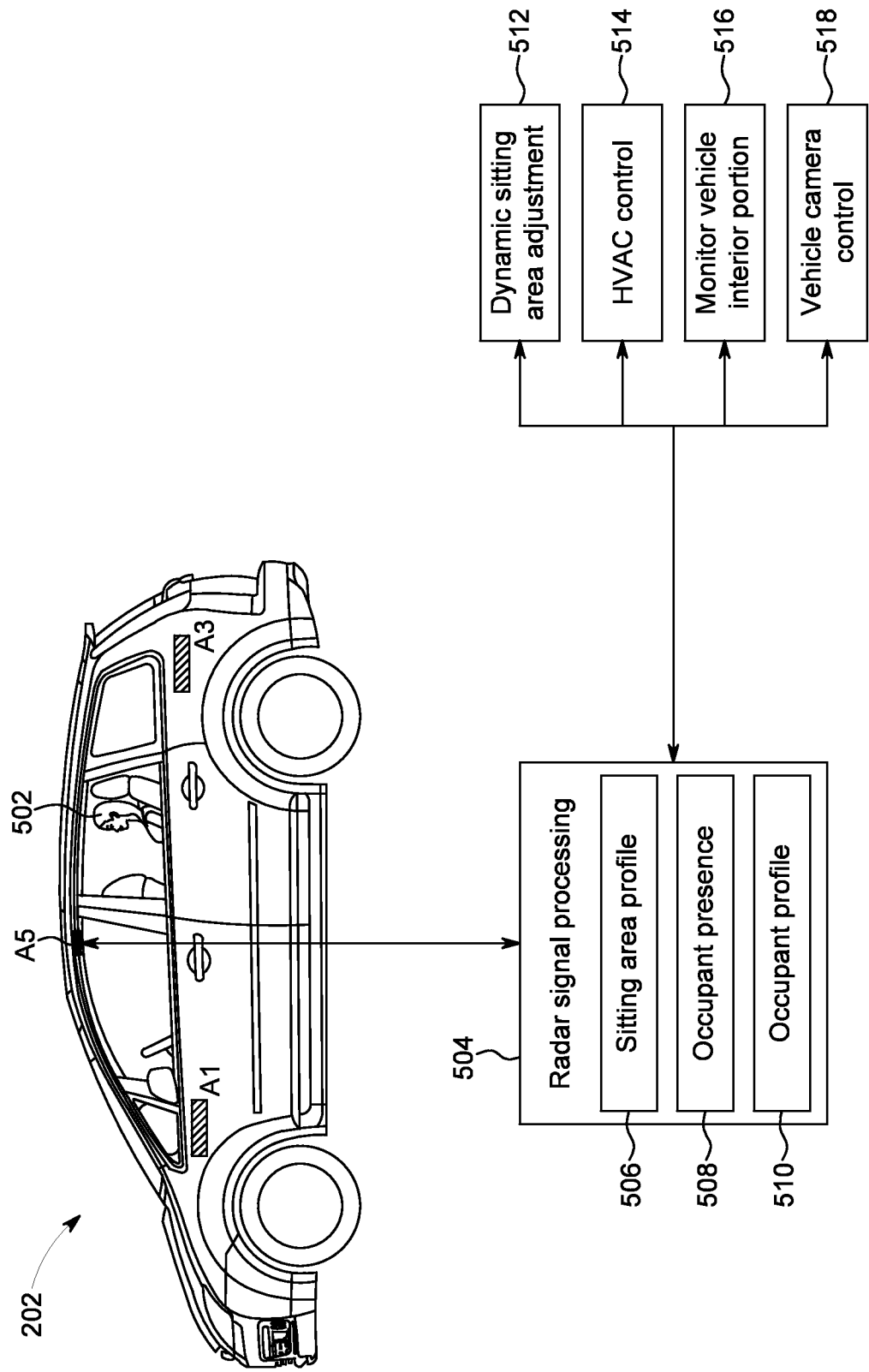
FIG. 5 illustrates example embodiments to control a vehicle by using the UWB transceivers of FIG. 4, in accordance with the present disclosure.

In addition, the processor 246 may determine/estimate sitting area profile associated with the sitting area 402, as depicted in block 506 of FIG. 5, based on the radar response signal processing. In some aspects, the sitting area profile may include information associated with foot well, legroom space, sitting area inclination, and/or the like. Stated another way, the processor 246 may analyze the radar response signal(s) reflected by the targets/objects inside the vehicle 202, and estimate position of sitting area(s) 402 inside the vehicle 202 (such as distance between two rows of sitting areas, sitting area inclination, etc.). In some aspects, the processor 246 may store the estimated sitting area profile in the vehicle database 250.

In addition, the processor 246 may determine an occupant presence on the sitting area 402 based on the reflected radar response signal, as depicted in block 508 of FIG. 5. For example, the processor 246 may determine whether an occupant (e.g., the occupant 502) is located inside the vehicle 202 and occupant location inside the vehicle 202. In some aspects, the processor 246 may store such information in the vehicle database 250 as occupant information.

Responsive to determining the sitting area profile and the occupant presence, the processor 246 may be configured to correlate the sitting area profile and the occupant presence, and determine respective sitting areas that may occupied by the occupants and sitting areas that may be vacant in the vehicle 202.

In addition, the processor 246 may determine occupant profile (as depicted in block 510 of FIG. 5) of each occupant in the vehicle 202 based on the radar response signal processing. Specifically, the processor 246 may "characterize" each occupant based on the radar response signal processing. For example, the processor 246 may characterize occupant type (e.g., human, pet or an object), occupant physiology (adult or child, tall or short occupant, and/or the like), etc. based on the radar response signal processing. In some aspects, the processor 246 may store such information in the vehicle database 250 as occupant information.

In further aspects, responsive to determining respective sitting areas that may occupied by the occupants and sitting areas that may be vacant in the vehicle 202, and/or occupant characteristic, the processor 246 may perform one or more actions. For example, the processor 246 may control operation of one or more vehicle components based on the determination described above. Examples of vehicle component operational control are described below. The following examples should not be construed as limiting the present disclosure scope.

In some aspects, the processor 246 may be configured to perform dynamic sitting area adjustment, as depicted in block 512, based on the determination described above. As described above, the processor 246 determines respective sitting areas that may be occupied and sitting areas that may be vacant in the vehicle 202. Based on such determination, the processor 246 may determine an updated sitting area profile for one or more sitting areas. Stated another way, the processor 246 may determine updated legroom for different sitting areas 402, updated inclination for different sitting areas 402, etc. based on sitting areas that may be occupied and vacant.

Responsive to determining the updated sitting area profile for each sitting area, the processor 246 may cause siting area adjustment based on the updated sitting area profile. For example, the processor 246 may transmit one or more command signals to the BCM 224 to move a sitting area (e.g., the sitting area 402b) backwards if no occupant is present on the sitting area 402c to provide more legroom to an occupant sitting on the sitting area 402b. Thus, the processor 246 may dynamically adjust the sitting area profile based on whether an occupant may be sitting on the sitting area or not.

In further aspects, the processor 246 may correlate the occupant profile and the sitting area profile, and perform sitting area adjustment based on the correlation. For example, the processor 246 may adjust the sitting area 402 to provide more legroom for an adult sitting in the vehicle 202, compared to a child sitting in the vehicle 202. Similarly, the processor 246 may adjust the sitting area to provide more legroom when a tall adult may be sitting on the sitting area 402.

In additional aspects, the processor 246 may be configured to control the vehicle HVAC system, as depicted in block 514 of FIG. 5, based on the occupant presence on the sitting area 402. For example, when no occupant may be sitting on the sitting area 402c, the processor 246 may control the HVAC system such that no air may be directed towards the sitting area 402c, thus saving vehicle energy.

As described above, the processor 246 may be configured to monitor the vehicle interior portion, depicted as block 516 in FIG. 5, based on the radar response signal processing. In some aspects, the processor 246 may monitor the vehicle interior portion when a vehicle ignition may be turned off (or during key-off scenarios). The processor 246 may monitor the vehicle interior portion during key-off scenarios, and may determine an object presence (such as items or occupants left behind in the vehicle 202) based on vehicle interior portion monitoring. Responsive to determining than an item or an occupant may be left behind in the vehicle 202, the processor 246 may be configured to perform one or more actions. For example, in this case, the processor 246 may transmit a notification to the mobile device 212 associated with the user 214 to indicate the object presence in the vehicle 202.

In further aspects, the processor 246 may be configured to determine that the vehicle 202 may be in a standby mode. Responsive to a determination that the vehicle 202 may be in the standby mode, the processor 246 may turn off modules associated with sitting areas that may be unoccupied and may keep the modules associated with the sitting area of the driver in operational state.

In further aspects, the processor 246 may be configured to trigger one or more vehicle components based on the object detection inside the vehicle 202. For example, the processor 246 may trigger a vehicle camera 404 (shown in FIG. 4), depicted as block 518 in FIG. 5, when the processor 246 determines that an occupant (e.g., a child or a pet) may be left behind in the vehicle 202 when the vehicle ignition may be turned off. The processor 246 may trigger (or turn-on) the vehicle camera 404 to monitor occupant activity/motion responsive to determining the occupant presence. In additional aspects, the processor 246 may transmit, via the transceiver 244, images/videos captured by the vehicle camera 404 to the mobile device 212.

Figure 6:
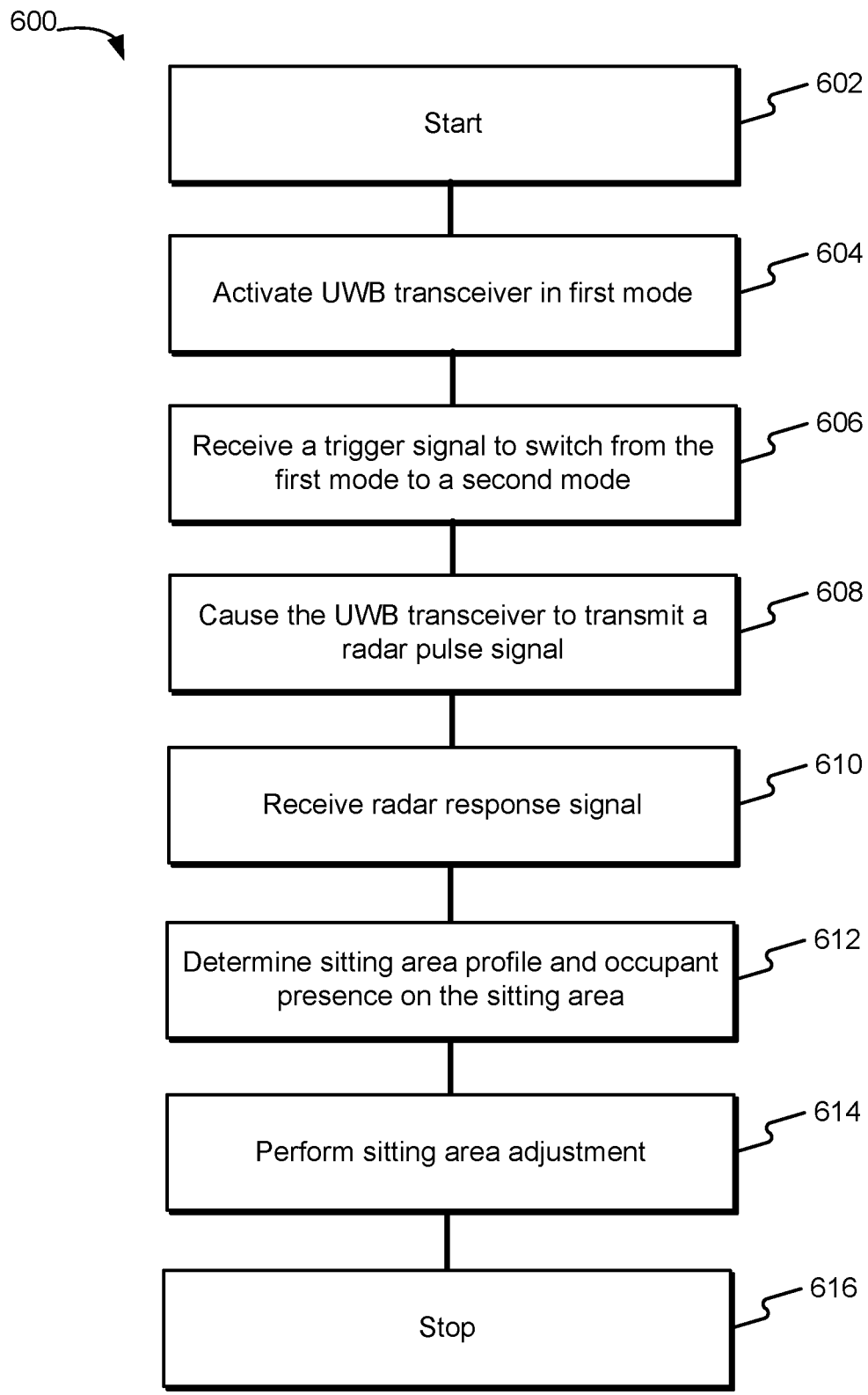
FIG. 6 depicts a flow diagram of an example method to control a vehicle by using UWB transceivers, in accordance with the present disclosure.

FIG. 6 depicts a flow diagram of an example method 600 to control the vehicle 202 by using the UWB transceiver A5, A6 and the BUN, in accordance with the present disclosure. FIG. 6 may be described with continued reference to prior figures, including FIGS. 1-5. The following process is exemplary and not confined to the steps described hereafter. Moreover, alternative embodiments may include more or less steps than are shown or described herein and may include these steps in a different order than the order described in the following example embodiments.

Referring to FIG. 6, at step 602, the method 600 may commence. At step 604, the method 600 may include activating, by the processor 246, the UWB transceiver (e.g., UWB transceiver A5, A6 and/or the BUN) in the first mode. In the first mode, the processor 246 may cause the UWB transceiver A5 to perform PaaK localization (e.g., for the first predetermined duration), as described above.

At step 606, the method 600 may include obtaining, by the processor 246, a trigger signal to switch the UWB transceiver A5 from the first mode to the second mode. In the second mode, the processor 246 may cause the UWB transceiver A5 to perform radar sensing (e.g., in the second predetermined duration). At step 608, the method 600 may include causing, by the processor 246, the UWB transceiver A5 to transmit a radar pulse signal responsive to obtaining the trigger signal.

At step 610, the method 600 may include receiving, by the processor 246, a radar response signal reflected by one or more targets/objects (e.g., a target location such as sitting area 402, occupants, etc.) inside the vehicle 202, responsive to transmitting the radar pulse signal. At step 612, the method 600 may include determining, by the processor 246, the sitting area profile and an occupant presence on the sitting area based on the reflected radar response signal, as described above. At step 614, the method 600 may include performing, by the processor 246, sitting area adjustment based on the determination of the sitting area profile and the occupant presence.

The method 600 may end at step 616.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A vehicle comprising:
    an ultra-wide band (UWB) transceiver configured to operate in a first mode and a second mode, wherein the UWB transceiver is configured to perform phone-as-a-key (PaaK) localization in the first mode and radar sensing in the second mode;
    a memory configured to store computer-executable instructions; and
    a processor configured to access the memory and execute the computer-executable instructions to:
        activate the UWB transceiver in the first mode for a first predetermined time duration in a first UWB cycle;
        obtain a trigger signal to switch the UWB transceiver from the first mode to the second mode for a second predetermined time duration in the first UWB cycle;
        cause the UWB transceiver to transmit a radar pulse signal responsive to obtaining the trigger signal;
        receive a radar response signal reflected from a target location inside the vehicle;
        determine a sitting area profile associated with a sitting area and an occupant presence on the sitting area based on the radar response signal; and
        perform sitting area adjustment based on the determination of the sitting area profile and the occupant presence.

2. The vehicle of claim 1, wherein the sitting area profile comprises information associated with foot well and legroom space.

3. The vehicle of claim 1, wherein the processor is further configured to:
    determine an occupant profile based on the radar response signal;
    correlate the occupant profile with the sitting area profile; and
    perform the sitting area adjustment based on the correlation.

4. The vehicle of claim 1, wherein the processor is further configured to cause the UWB transceiver to perform the PaaK localization and radar sensing in a first UWB cycle and a second UWB cycle.

5. The vehicle of claim 4, wherein the processor is further configured to:
    cause the UWB transceiver to operate in the first mode in the first predetermined time duration in the first UWB cycle to perform the PaaK localization; and
    cause the UWB transceiver to transmit a UWB localization signal in the first predetermined time duration, wherein the first UWB cycle and the second UWB cycle are associated with a PaaK polling rate.

6. The vehicle of claim 4, wherein the processor is further configured to:
    cause the UWB transceiver to operate in the second mode in the second predetermined time duration in the first UWB cycle to perform the radar sensing; and
    cause the UWB transceiver to transmit the radar pulse signal in the second predetermined time duration.

7. The vehicle of claim 5, wherein the processor is further configured to cause the UWB transceiver to sample a localization response signal in a third predetermined time duration in the second UWB cycle.

8. The vehicle of claim 6, wherein the processor is further configured to cause the UWB transceiver to sample the radar response signal at a fourth predetermined time duration in the second UWB cycle.

9. The vehicle of claim 1, wherein the processor is further configured to control a vehicle Heating, Ventilation, and Air Conditioning (HVAC) system based on the occupant presence on the sitting area.

10. The vehicle of claim 1, wherein the processor is further configured to:
    monitor a vehicle interior portion based on the radar response signal when a vehicle ignition is turned-off, wherein the monitoring comprises detecting an object presence in the vehicle interior portion; and
    perform one or more actions responsive to detecting the object presence.

11. A method to control a vehicle, the method comprising:
    activating, by a processor, an ultra-wide band (UWB) transceiver in a first mode for a first predetermined time duration in a first UWB cycle, wherein the UWB transceiver is configured to operate in the first mode and a second mode, and wherein the UWB transceiver is configured to perform phone-as-a-key (PaaK) localization in the first mode and radar sensing in the second mode;
    obtaining, by the processor, a trigger signal to switch the UWB transceiver from the first mode to the second mode for a second predetermined time duration in the first UWB cycle;
    causing, by the processor, the UWB transceiver to transmit a radar pulse signal responsive to obtaining the trigger signal;
    receiving, by the processor, a radar response signal reflected from a target location inside the vehicle;
    determining, by the processor, a sitting area profile associated with a sitting area and an occupant presence on the sitting area based on the radar response signal; and
    performing, by the processor, sitting area adjustment based on the determination of the sitting area profile and the occupant presence.

12. The method of claim 11, wherein the sitting area profile comprises information associated with foot well and legroom space.

13. The method of claim 11 further comprising:
    determining an occupant profile based on the radar response signal;
    correlating the occupant profile with the sitting area profile; and
    performing the sitting area adjustment based on the correlation.

14. The method of claim 11 further comprising causing the UWB transceiver to perform the PaaK localization and radar sensing in a first UWB cycle and a second UWB cycle.

15. The method of claim 14 further comprising:
causing the UWB transceiver to operate in the first mode in the first predetermined time duration in the first UWB cycle to perform the PaaK localization; and
causing the UWB transceiver to transmit a UWB localization signal in the first predetermined time duration, wherein the first UWB cycle and the second UWB cycle are associated with a PaaK polling rate.

16. The method of claim 14 further comprising:
causing the UWB transceiver to operate in the second mode in the second predetermined time duration in the first UWB cycle to perform the radar sensing; and
causing the UWB transceiver to transmit the radar pulse signal in the second predetermined time duration.

17. The method of claim 15 further comprising causing the UWB transceiver to sample a localization response signal in a third predetermined time duration in the second UWB cycle.

18. The method of claim 16 further comprising causing the UWB transceiver to sample the radar response signal at a fourth predetermined time duration in the second UWB cycle.

19. The method of claim 11 further comprising controlling a vehicle Heating, Ventilation, and Air Conditioning (HVAC) system based on the occupant presence on the sitting area.

20. A non-transitory computer-readable storage medium having instructions stored thereupon which, when executed by a processor, cause the processor to:
activate an ultra-wide band (UWB) transceiver in a first mode, wherein the UWB transceiver is configured to operate in the first mode and a second mode, and wherein the UWB transceiver is configured to perform phone-as-a-key (PaaK) localization in the first mode and radar sensing in the second mode for a first predetermined time duration in a first UWB cycle;
obtain a trigger signal to switch the UWB transceiver from the first mode to the second mode for a second predetermined time duration in the first UWB cycle;
cause the UWB transceiver to transmit a radar pulse signal responsive to obtaining the trigger signal;
receive a radar response signal reflected from a target location inside a vehicle;
determine a sitting area profile associated with a sitting area and an occupant presence on the sitting area based on the radar response signal; and
perform sitting area adjustment based on the determination of the sitting area profile and the occupant presence.

\* \* \* \* \*